March 27, 1956  A. T. KUNKEL  2,739,358
PLASTIC WEATHER STRIP
Filed Oct. 11, 1952
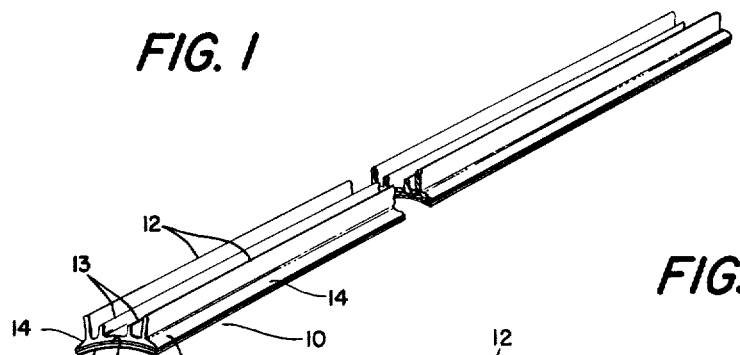
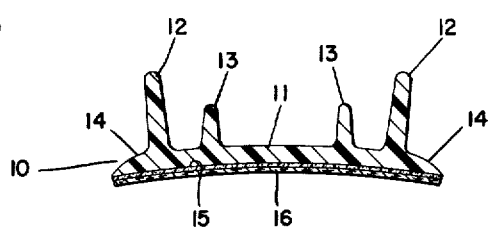
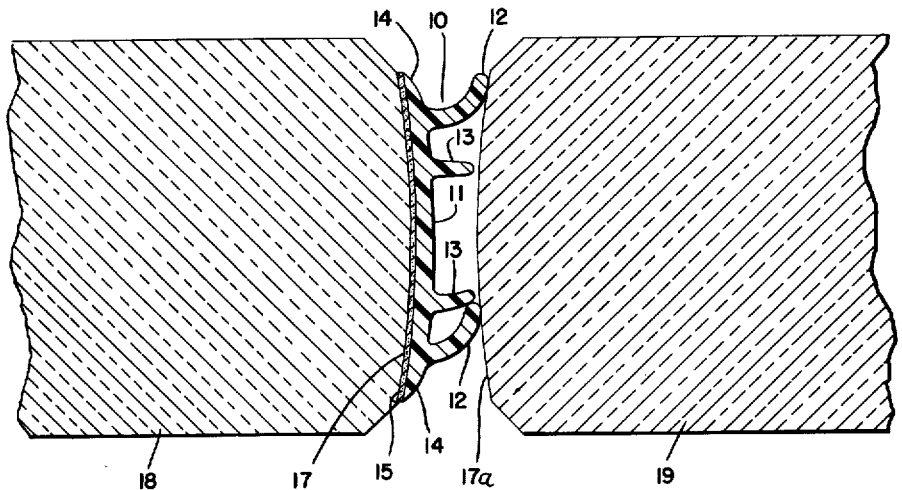
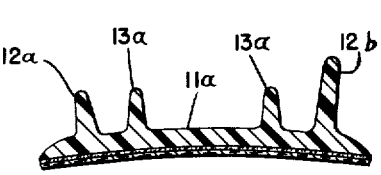
INVENTOR.
ALOYSIUS T. KUNKEL
BY
William Cleland
ATTORNEY United States Patent Office 2,739,358
Patented Mar. 27, 1956

2,739,358

PLASTIC WEATHER STRIP

Aloysius T. Kunkel, Akron, Ohio

Application October 11, 1952, Serial No. 314,325

6 Claims. (Cl. 20—69)

This invention relates to weather stripping, and in particular relates to weather stripping of rubber-like elastic material as for application between the spaced inner edges of opposite panels of glass swinging doors.

Heretofore, no satisfactory means has been devised for sealing the usual space between the glass panels of swinging doors, said space usually being approximately one eighth of an inch or more to assure that there will be no breakage due to the edges of the glass panels banging together. Difficulty has been found both in providing a sealing strip which would not interfere with swinging action of the doors but also in providing any kind of strip which could be properly attached to glass to withstand the abusive wiping action at the edges of the heavy glass panels.

One object of this invention is to provide improved weather stripping which is easily applicable to the inner edge of one glass panel of a glass door in a manner which seals against the opposing edge of the other panel without interference with free swinging movement of the panels past each other even though there may be a substantial variance in the space between the edges of the panels.

Another object of the invention is to provide a resilient plastic weather sealing strip of the character described which is capable of being firmly adhesively applied to the edge of a glass door panel, and which facilitates the use of pressure applying tools for that purpose.

Other objects of the invention will be manifest from the following brief description and the accompanying drawings.

Of the accompanying drawings:

Figure 1 is a perspective view, partly broken away, of a length of weather stripping embodying the features of the invention.

Figure 2 is an enlarged cross-section taken transversely through the same.

Figure 3 is a horizontal cross-section, on a further enlarged scale, of the adjacent inner edge portions of glass door panels, with the weather stripping attached to one said edge portion.

Figure 4 is a view similar to Figure 2 illustrating a modified form of the invention.

Referring particularly to Figures 1 and 2 of the drawings, there is illustrated a weather sealing strip 10, extruded as a one-piece body from rubber-like, resilient plastic material by known plastic extrusion methods. One type of material which is particularly suitable for the present purposes is synthetic vinyl resin plastic which has a rubber-like tendency to resume normal extruded shape, but having the quality, for example, of being available in clear transparent condition which will not detract from the attractive transparency of glass doors to which the strip is applied.

Strip 10 includes an elongated thin, flexible base 11 (approximately .032 inch), of outwardly concave and inwardly convex transverse cross-section along the length thereof and having a plurality of elongated ribs 12, 12 and 13, 13 extending outwardly of said convex side substantially normal to the same, these ribs being outwardly tapered but substantially the same general thickness as the base to be resiliently flexible. Outer ribs 12, 12 are spaced inwardly of the marginal edges of the base 11 to define freely extending marginal portions or flanges 14, 14. The inner ribs 13, 13 are in relatively closely spaced relation to the adjacent outer ribs 12, 12 and are sufficiently shorter in depth than the same, whereby upon substantial inward flexing of the outer ribs in use, as will be described, they are adapted to be supported by the adjacent inner ribs, and the relative depths of said adjacent ribs are such that in a fully flattened condition of the same toward the base they will not extend beyond the longitudinal center-line of the strip. The spacing between all adjacent ribs is substantial, as shown, whereby portions of a pressure-applying tool (not shown) are freely engageable with the convex side of the base intermediate adjacent ribs and with said marginal portions 14.

For bonding the strip 10 to a surface, on the outer or concave side of base 11 may be a thin layer 15 of self-curing plastic adhesive material, of known type, a layer 16 of paper or linen being removably adhered to the outer face of said adhesive layer to protect the same until the strip 10 is adhered to said surface.

Referring to Figure 3, the improved plastic strip 10 is primarily intended for use to seal the space between inwardly opposite convex edges 17 and 17a of thick glass door panels 18 and 19 of known type which are hinged to swing in either direction from the closed position shown. After removing protective layer 16 from a suitable length of plastic strip 10 the latter is pressed onto the convex edge 17 of panel 18, as by means of a roller type stitching tool (not shown), having annular portions firmly engageable with the convex surface portions of the base 11 of the strip intermediate adjacent ribs, and with the outer marginal portions 14.

With the strip 10 thus applied and firmly adhered to the panel 18 the opposite panel 19 upon being swung to closed position with reference thereto will have its convex edge 17a in engagement with the outer ribs 12, 12 yieldingly to flex the same slightly inwardly of base 11, as shown in Figure 3, and thereby to provide an effective seal against passage of air and dirt between the panels. If for any reason the space between the glass panels is reduced or non-uniform, at least one inwardly flexed outer rib 12 will be resiliently supported by its adjacent inner rib 13. With the spacing and proportioning of the ribs as shown the space between the edges of the panels may be reduced to half or less than that shown in Figure 3, without undesirable bending action in any of the numerous possible flexed conditions of the ribs caused by swinging the panels relatively of each other.

The modified strip shown in Figure 4 is substantially like that shown in Figures 1 to 3, except that it is provided with two intermediate ribs 13a, 13a and one outer or marginal rib 12a which are of substantially equal depth shorter than the opposite marginal rib 12b. This design of strip is particularly suited for use on the edge of a single panel glass door which does not swing through its door frame (not shown), but only from and toward closed position therein, in which instance the rib 12b would be flexed toward supporting relation of the adjacent shorter rib 13a in the manner shown at the lower portion of Figure 3. The three shorter ribs, in addition to reinforcing the relatively thin base portion 11a, serve to seal a given space between the free edge of the glass panel and the corresponding edge of the door frame (not shown) when said space becomes less than said given space for reasons described above.

Modifications of the invention may be resorted to without departing from the spirit thereof or the scope of the appended claims.

What is claimed is:

1. A weather sealing strip for the space between relatively movable laterally opposed edge portions of a swinging door structure, comprising a one-piece elongated body of resilient plastic material, said body having a thin flexible base portion for attachment against one said edge portion, laterally spaced thin, flexible ribs extending from one face of said base outwardly adjacent outer edges of the same and an inner thin, flexible rib of shorter depth extending from said one side of the base in spaced relation to each said outer rib and coextensive with the same, said base being adapted to be adhered to said one edge portion of the door structure to have at least one of the ribs in flexed contact with the opposed edge portion of the door structure, each said rib being composed of a single thickness of the plastic material and the total thickness of the strip in fully flexed condition of the ribs against said base will not be substantially greater than the thickness of said base and thereby allowing for substantial variations in the space between said opposed edge portions.

2. A weather sealing strip for the space between relatively movable laterally opposed edge portions of a swinging door structure, comprising a one-piece elongated body of resilient plastic material, said body having a thin flexible base portion for attachment against one said edge portion, laterally spaced thin, flexible ribs extending outwardly adjacent outer edges of the base and an inner thin, flexible rib extending from said one face of the base in spaced relation to each said outer rib and coextensive with the same, said base being adapted to be adhered to said one edge portion of the door structure to have at least one of the ribs in flexed contact with the opposed edge portion of the door structure, each said rib being composed of a single thickness of the plastic material and the total thickness of the strip in fully flexed condition of the ribs against said base will not be substantially greater than the thickness of said base and thereby allowing for substantial variations in the space between said opposed edge portions, said base being concavo-convex with said one face concave and said ribs extending outwardly substantially normal to the convex face of the base, said laterally outward ribs being inwardly spaced from the outer edges of said base and the adjacent ribs being substantially spaced with respect to each other, whereby portions of a pressure applying tool are freely engageable with the convex side of said base at laterally opposite sides of each said rib for pressing the concave side of the base into full conformity with a convex said one edge of the door structure.

3. A weather sealing strip for the space between relatively movable laterally opposed edge portions of a swinging door structure, comprising a one-piece elongated body of resilient plastic material, said body having a thin flexible base portion for attachment against one said edge portion, laterally spaced thin, flexible ribs extending from one face of said base outwardly adjacent outer edges of the same and an inner thin, flexible rib extending from said one face of the base in spaced relation to each said outer rib and coextensive with the same, said base being adapted to be adhered to said one edge portion of the door structure to have at least one of the ribs in flexed contact with the opposed edge portion of the door structure, each said rib being composed of a single thickness of the plastic material and the total thickness of the strip in fully flexed condition of the ribs against said base will not be substantially greater than the thickness of said base and thereby allowing for substantial variations in the space between said opposed edge portions, said ribs extending outwardly substantially normal to the other face of the base, said laterally outward ribs being inwardly spaced from the outer edges of said base and the adjacent ribs being substantially spaced with respect to each other, whereby portions of a pressure applying tool are freely engageable with said other face of said base at laterally opposite sides of each said rib for pressing the base against said one edge portion of the door structure.

4. A weather sealing strip for the space between relatively movable laterally opposed edge portions of a swinging door structure, comprising a one-piece elongated body of resilient plastic material, said body having a thin flexible base portion for attachment against one said edge portion, laterally spaced thin, flexible ribs extending outwardly adjacent outer edges of the base and an inner thin, flexible rib of shorter depth extending from said one face of the base in spaced relation to each said outer rib and coextensive with the same, said base being adapted to be adhered to said one edge portion of the door structure to have at least one of the ribs in flexed contact with the opposed edge portion of the door structure, each said rib being composed of a single thickness of the plastic material and the total thickness of the strip in fully flexed condition of the ribs against said base will not be substantially greater than the thickness of said base and thereby allowing for substantial variations in the space between said opposed edge portions, said ribs extending outwardly substantially normal to said one face of the base, said laterally outward ribs being inwardly spaced from the outer edges of said base and the adjacent ribs being substantially spaced with respect to each other, whereby portions of a pressure applying tool are freely engageable with said one face of said base at laterally opposite sides of each said rib for pressing the base into full conformity with a convex said one edge of the door structure, said base having a layer of adhesive material adhered to said one edge portion of the door structure.

5. A weather sealing strip for the space between relatively movable laterally opposed edge portions of a swinging door structure, comprising a one-piece elongated body of resilient plastic material, said body having a thin flexible base portion for attachment against one said edge portion, a plurality of laterally spaced thin, flexible ribs extending outwardly from one face of the base in laterally spaced relation to each other and said ribs extending outwardly substantially normal to said one face of the base, said laterally outward ribs being inwardly spaced from the outer marginal edges of said base and the adjacent ribs being substantially spaced with respect to each other, whereby portions of a pressure applying tool are freely engageable with said one face of said base at laterally opposite sides of each said rib for pressing the other face of the base into full conformity with said one edge of a door structure the depths of adjacent said ribs at each side of the longitudinal centerline of said base being such that in fully flattened condition of the ribs inwardly toward the base they will not extend beyond the longitudinal centerline of the strip.

6. A weather sealing strip for the space between relatively movable laterally opposed edge portions of a swinging door structure, comprising a one-piece elongated body of resilient plastic material, said body including a relatively thin, flexible base portion for attachment against one said edge portion, said base being of concavo-convex cross-section along the length of the body, a plurality of laterally spaced, thin, flexible outer ribs of substantial depth extending outwardly of the convex side of the base along the outer edges thereof, and a thin, flexible rib inwardly spaced from each said outer rib, at least one said outer rib being of depth substantially greater than the others, said ribs being not substantially thicker than said relatively thin base portion.

References Cited in the file of this patent

UNITED STATES PATENTS

| | | |
|---|---|---|
| 1,883,609 | Dennis | Oct. 18, 1932 |
| 2,331,340 | Mosher | Oct. 12, 1943 |
| 2,592,861 | Close | Apr. 15, 1952 |
| 2,608,728 | Montgomery | Sept. 2, 1952 |

FOREIGN PATENTS

| | | |
|---|---|---|
| 833,651 | France | July 25, 1938 |

UNITED STATES PATENT OFFICE
CERTIFICATE OF CORRECTION

Patent No. 2,739,358                           March 27, 1956

Aloysius T. Kunkel

It is hereby certified that error appears in the printed specification of the above numbered patent requiring correction and that the said Letters Patent should read as corrected below.

Column 3, lines 15 and 34, for "will not be", each occurrence, read -- being not --; line 40, strike out "laterally outward"; same line, after "ribs" insert -- adjacent the outer edges of said base --; line 64, for "will not be" read -- being not --; line 68, strike out "laterally outward"; same line, after "ribs" insert -- adjacent the outer edges of said base --; column 4, line 21, after "base," insert -- outermost of --; same line, for "outward" read -- spaced --; line 28, after "having" insert -- thereon --; line 29, for "adhered" read -- for adhering said base portion --; line 39, after "base," insert -- outermost of --; same line, for "outward" read -- spaced --; line 46, after "structure" insert a comma.

Signed and sealed this 24th day of June 1958.

(SEAL)
Attest:
KARL H. AXLINE
Attesting Officer

ROBERT C. WATSON
                                                                 Commissioner of Patent